April 22, 1924.
R. C. HILTON
CROSS CHAIN LINK
Filed March 17, 1923
1,491,400
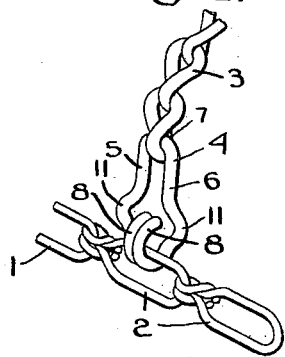
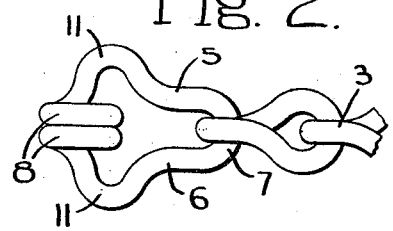
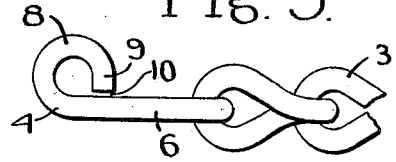
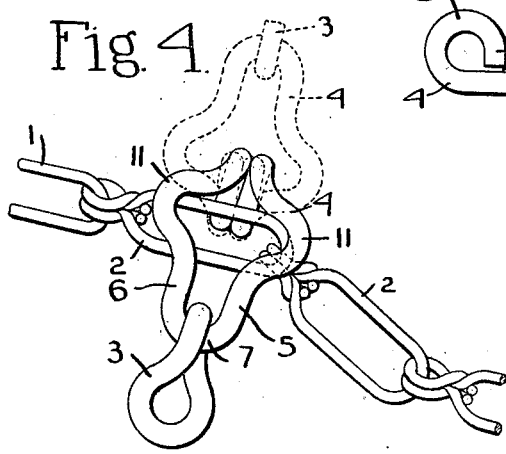
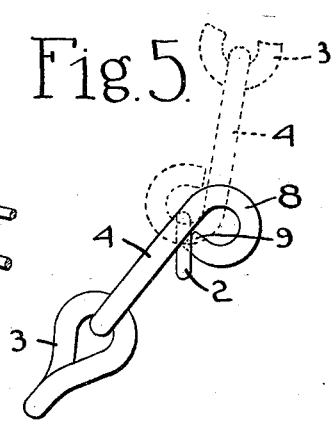
Inventor.
Roland C. Hilton
by Heard Smith & Tennant.
Attys.

Patented Apr. 22, 1924.

1,491,400

UNITED STATES PATENT OFFICE.

ROLAND C. HILTON, OF TROY, NEW YORK, ASSIGNOR TO H. S. H. MACHINE CO. INC., OF TROY, NEW YORK, A CORPORATION OF NEW YORK.

CROSS-CHAIN LINK.

Application filed March 17, 1923. Serial No. 625,696.

*To all whom it may concern:*

Be it known that I, ROLAND C. HILTON, a citizen of the United States, and resident of Troy, county of Rensselaer, State of New York, have invented an Improvement in Cross-Chain Links, of which the following description, in connection with the accompanying drawing, is a specification, like characters on the drawing representing like parts.

This invention relates to chain links and particularly to the end links of the cross chains of a tire chain such as is commonly used on automobile tires.

One of the objects of the invention is to provide an improved cross chain link which permits the cross chain to be attached to or detached from the side chain without the use of any tools.

Another object of the invention is to provide an improved cross chain link which can be attached to the side chains while the tire chains are on the tire and which is so constructed that when attached it will be securely locked to the side chain and cannot be removed except by special manipulation.

A further object of the invention is to provide an improved cross chain link which is constructed so that if the cross chain breaks the link will be automatically detached from the side chain thus eliminating the unpleasant noise resulting from broken cross chains striking the fender of the automobile.

Other objects of my invention are to provide improvements in cross chains all as will be more fully hereinafter set forth.

In order to give an understanding of the invention I have illustrated in the drawings a selected embodiment thereof which will now be described after which the novel features will be pointed out in the appended claim.

Fig. 1 is a fragmentary perspective view showing a cross chain link embodying my invention;

Fig. 2 is a plan view of the improved cross chain link;

Fig. 3 is an edge view thereof;

Fig. 4 is a perspective view illustrating the manner in which the cross chain link is applied to the side chain;

Fig. 5 is a side view of the end link 4 showing it in the position indicated in Fig. 4.

In the drawings I have shown at 1 a portion of a side chain of a tire chain which is provided with the usual links 2 and at 3 I have illustrated a cross chain. This cross chain is provided at its end with a special link 4 forming the subject of my invention and by which the cross chain is attached to one of the links 2 of the side chain. This link 4 is formed with the two arms 5 and 6 bent to present the loop 7 between them, said loop passing through a link of the cross chain 3. The ends of the arms 5 and 6 are bent into hook portions 8 which occupy planes at substantially right angles to the plane of the arms 5 and 6. These hooks 8 are adapted to receive one side of the side-chain link 2 when the cross chain is attached to the side chain.

The ends 9 of the hooks 8 extend substantially to the plane occupied by the arms 5, 6 of the link 4 so that the space 10 between the ends of the hooks 8 and the upper face of the arms 5 and 6 is considerably narrower than the diameter of the wire forming the link 2 of the side chain. When, therefore, the chain link 4 is hooked onto the link 2 of the side chain said links will not be separated in the ordinary operation of the tire chain.

In order to provide for attaching the link 4 to a side chain link 2 I propose to make the arms 5 and 6 of the shape shown in Fig. 2, the portion 11 of each arm opposite the points of the hook being bent outwardly so that the distance between the portions 11 of the arms 5 and 6 is considerably greater than the distance between the arms at other points. In fact, the distance between the offset portions 11 is sufficient so that the end portion of a link 2 may be inserted between the portions 11 of the link 4 and pass under the ends 9 of the hooks 8 as shown in Figs. 4 and 5 thus connecting the link 4 to the link 2.

In attaching the link 4 to the link 2 of a side chain which is in place on the tire the adjacent link 2 will be displaced slightly with reference to the link 2 to which the cross chain link 4 is to be attached as shown in Fig. 4 and then the cross chain link 4 is turned with the loop portion 7 directed downwardly and placed with relation to the link 2 so that the end portion of the link can be entered into the space between the outwardly bent portions 11 of said link 4 and thus entered underneath the ends 9 of the hooks 8 as shown in Figs. 4 and 5 after which the link 4 may be swung back upwardly into the dotted line position Fig. 4 this completing the operation of attaching said links together. When the links are thus attached together they cannot be disconnected except by a reverse relative movement of the two links and this can never occur while the tire chain is in use. If, however, the cross chain breaks then during the rotation of the automobile wheel and especially when the broken link comes in contact with the pavement the end links 4 of the cross chain will be very likely to assume the position relative to the side chain shown in Fig. 4 so that they will be automatically disconnected from the side chain. This is a very great advantage because it eliminates the continual noise resulting from a broken cross chain.

I claim:

A chain link for connecting a cross chain of a tire chain structure to the side chain thereof, said link being formed from a single piece of wire bent centrally to form a relatively narrow loop having arms sufficiently separated from each other to receive a link of the cross chain, the ends of the wire having a parallel relation and being bent to form hooks which lie in planes at right angles to that of the loop, the extremities of the hooks extending to a plane slightly above the plane of said arms, whereby the cross chain may be applied to the side chain link when the chain is on a wheel, the portion of each arm opposite to the ends of the hooks and between the latter and the loop being bent outwardly thereby to form a space at this point of sufficient width to permit the link of the side chain to be inserted between the arms and to pass under the ends of the hooks.

In testimony whereof, I have signed my name to this specification.

ROLAND C. HILTON.